Oct. 23, 1928.

J. T. FEWKES

PLANT CONTAINER

Filed April 11, 1927

1,689,017

2 Sheets-Sheet 1

WITNESSES:

INVENTOR:
Joseph T. Fewkes,
BY
ATTORNEY

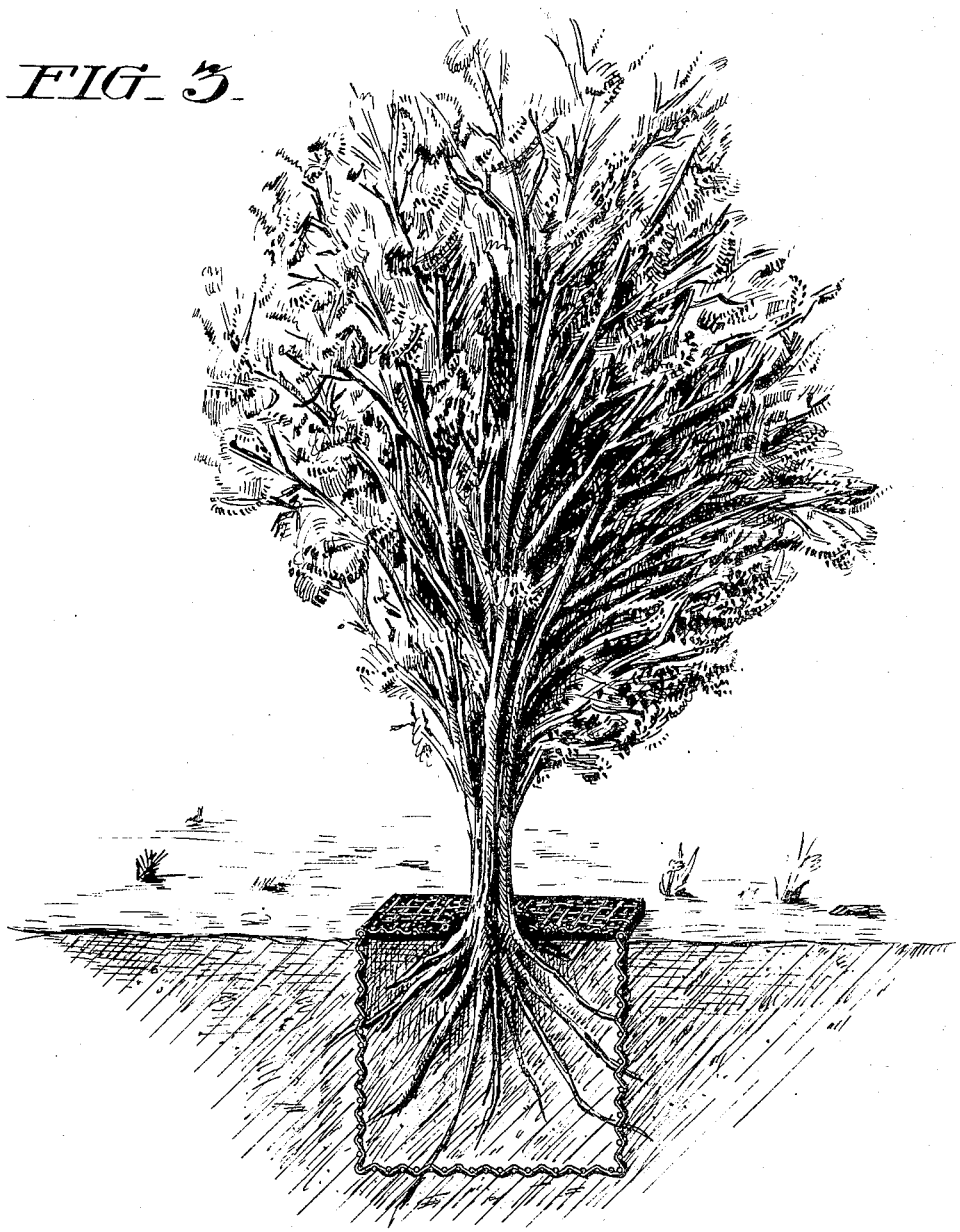

Patented Oct. 23, 1928.

1,689,017

UNITED STATES PATENT OFFICE.

JOSEPH T. FEWKES, OF PHILADELPHIA, PENNSYLVANIA.

PLANT CONTAINER.

Application filed April 11, 1927. Serial No 182,626.

My invention relates to flower pots and more particularly to a pot or container adapted to be embedded in the ground.

In many sections of the country, moles and other burrowing animals cause great havoc by destroying the roots and bulbs of plants, trees and shrubs, and the principal object of my invention is to provide a device which is adapted to prevent them from reaching the main roots or bulbs of such plants.

Another object of my invention is to provided a pot or container that will last for a long period of time when embedded in the ground, and which is so sturdily built that it is able to support the plant should it be desired to move same from one place to another.

Figure 1:
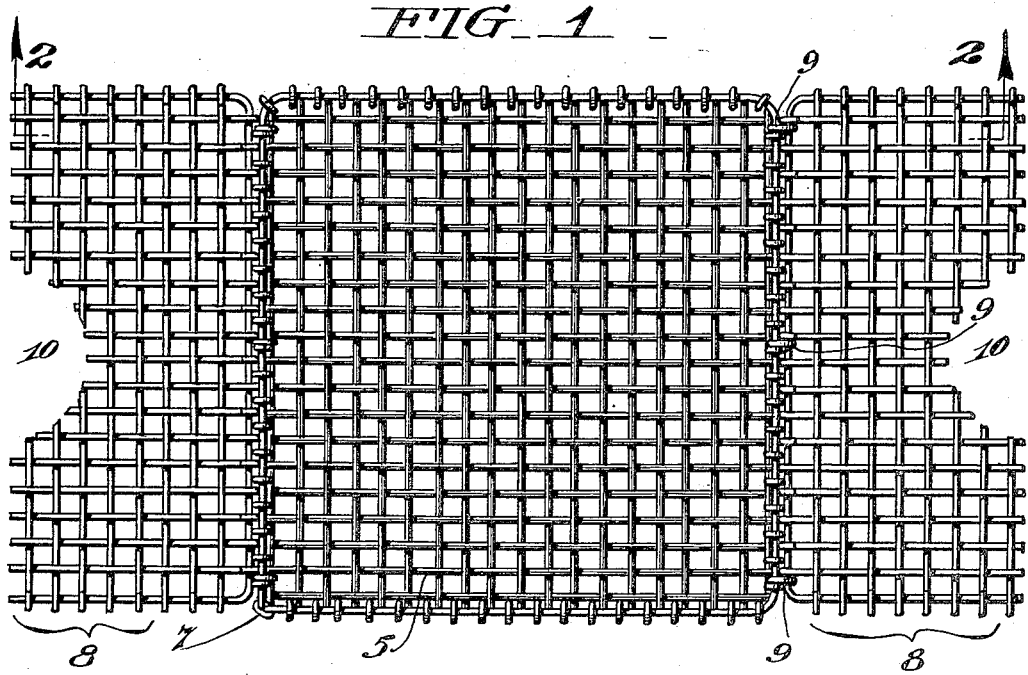
Figure 2:
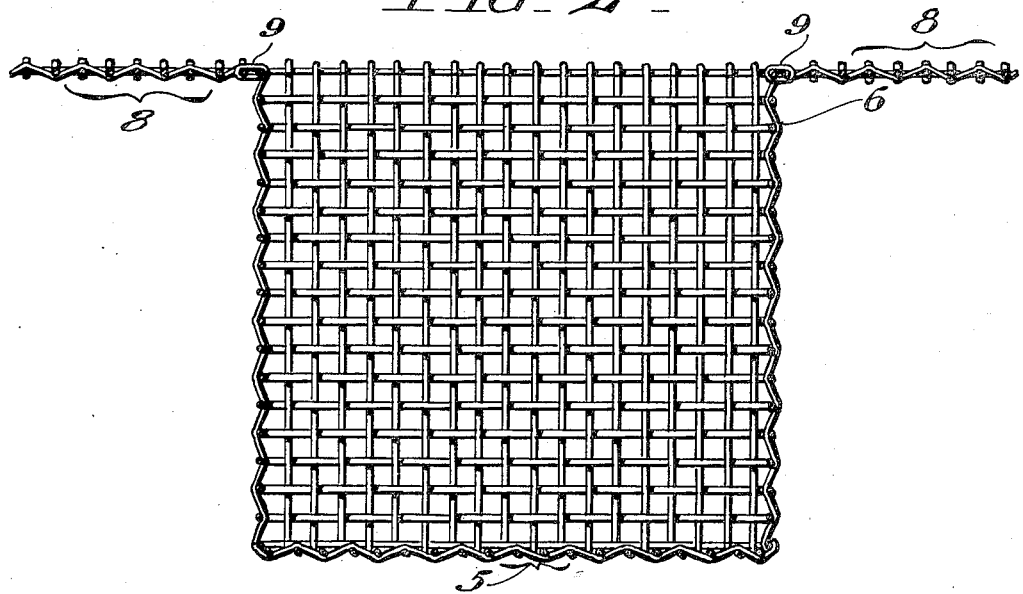

These objects, and other advantageous ends which will be described hereinafter, I attain in the following manner, reference being had to the accompanying drawings in which Figure 1 is a top plan view of an embodiment of my invention, Figure 2 a sectional view taken on line 2—2 on Figure 1, and Figure 3 shows my device as it would appear when embedded in the ground and a plant growing therein.

Referring now more in detail to the drawings, the device may be made in any desired shape and size, but it has been illustrated as having a flat rectangular bottom 5 and vertical side walls 6. The container is preferably made from heavy woven wire mesh and heavily galvanized to protect same against the action of the elements as well as to hold the wires forming the mesh in spaced relation to one another. While the container may be made of any desired material, unless it is of substantial weight and properly protected, as by galvanizing, it will quickly rust out and be worthless after the first year of use.

The container may be formed in any desired manner, but a suitable way in which to produce same is to provide side walls 6 in a continuous strip of a suitable length to engage all four sides of bottom 5 and to fasten the ends of the side walls together at corner 7 by bending over the ends of the wire forming the mesh. The sides of side walls 6 are preferably selvage and bottom 5 is fastened thereto by bending protruding wires over the lowermost strand of the wire in the side walls. Two half covers 8 may be hinged to two sides of the container in any suitable manner, as by means of a plurality of rings or links 9 encircling the top wire of the side wall and the wire along the edge of the cover, and substantially close the open side of the container with the exception of a central aperture resulting from indentations 10 formed in each half cover.

In using the container, it is buried with its upper edge close to the surface of the ground and the plant set therein in the same manner as it would be set in the ground were the container not used. If the container is equipped with half covers 8, these are turned inwardly and the plant extends through the aperture formed by indentations 10, thus protecting its roots from attack from above, as by chickens and dogs. When the plant has grown until its stem fills the aperture formed by indentations 10, it will engage the sides of the aperture and move covers 8 upwardly; consequently, indentations 10 may be made any desired size.

Due to the container being formed of wire mesh, the plant is enabled to draw its nutriment and moisture from the surrounding soil with as much facility as though it were not planted inside the container. As the plant grows, its smaller roots may reach out through the mesh into the surrounding soil and the growth of the plant is in no way retarded. While the small roots protruding through the wire mesh are open to attack, the number of such roots that are liable to be found by burrowing animals is relatively small and no noticeable damage is done to the plant by the destruction of such roots as they may find.

Different creatures burrow at different depths and, while some of them will not eat roots, plants are nevertheless destroyed by the creature burrowing beneath them. While moles burrow at a very short distance below the surface of the ground, they are very destructive to plant life, and will go deeper in search of food or dig under an obstruction. Consequently, my container is preferably provided with the bottom 5 so that animals cannot burrow underneath the side walls 6 and then burrow upwardly and come in contact with the heart of the plant.

My invention is equally adaptable for the planting of flowers, plants, shrubs, and trees, it being understood that it is provided in a variety of sizes in order to meet the needs of the particular plant which is to be set therein.

Should it be desired to move the plant from its present location, the container is removed from the ground and placed in a new location together with the soil and plant contained therein.

While I have described my invention as taking a particular form, it will be understood that modifications may be made without departing from the spirit thereof, and hence I do not limit myself to the precise construction set forth, but consider that I am at liberty to make such changes and alterations as fairly come within the scope of the appended claim.

Having thus described my invention, what I claim as new and desire to secure by Letters Patent is:—

A container, composed of woven wire mesh, including a flat rectangular bottom, a continuous side wall rigidly secured to the bottom and having a border wire extending around its upper edge, half covers resting on the upper edge of the side wall and each having a border wire along its outer edge and a notch extending inwardly from its inner edge, and links encircling the border wire along the outer edge of each half cover and the adjacent portion of the border wire in the side wall to form hinges; whereby the container may be embedded in the ground with a plant growing therein and extending through the aperture formed by the notches in the half covers and raise said half covers as it increases in size due to the hinged connection of the covers to the side walls.

In testimony whereof I have signed my name to this specification.

JOSEPH T. FEWKES.